Patented Feb. 22, 1927.

1,618,868

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

ETHYL ACETATE VARNISH REMOVER.

No Drawing.     Application filed December 21, 1923. Serial No. 682,069.

This invention relates to a paint and varnish removing composition consisting essentially of ethyl acetate and waxy material capable of retarding evaporation.

The object of the invention is to provide a remover capable of exerting a rapid softening action on nitrocellulose lacquers and paints and on shellac varnish coatings and other spirit varnish coatings.

The remover customarily employed at the present time is composed of benzol, serving as a wax solvent, methyl acetone and alcoholic solvents and waxy material. The benzol or similar hydrocarbon wax solvent is practically without solvent action on substances such as nitrocellulose or resins such as shellac. In the present invention no hydrocarbon wax solvent is employed, the sole or essential solvent being ethyl acetate. This solvent, preferably in the anhydrous form, has a pronounced solvent action on waxes such as paraffin wax. This solvent action is in nowise comparable with that exerted by benzol but on the other hand is far greater than the solvent action of ethyl alcohol or acetone on wax.

This action may be shown in the following manner. To a concentrated solution of paraffin wax and benzol add ethyl acetate whereupon wax is precipitated. To a solution of the same wax in ethyl acetate add ethyl alcohol and wax will likewise be precipitated.

The utilization of volatile solvents as varnish removers depends upon the retention of the solvent on the surface of the finish through the agency of a film of wax formed on exposure of the solution and serving as a blanket or coating which retards evaporation permitting the solvent to dissolve the finish. Ethyl alcohol for example will not retain sufficient wax to form an effective film while ethyl acetate is capable of doing this. If ethyl acetate is warmed with 2 or 3 per cent of paraffin wax a clear solution is obtained, whereas warmed in alcohol the paraffin wax will melt and form oily globules which do not dissolve to any appreciable extent. Ethyl acetate will dissolve for example linseed oil while denatured alcohol has only a very slight solvent action thereupon. The acetate has wider solvent properties in general than is the case with ethyl alcohol.

In the present invention it is the purpose to prepare a removing composition of a single or unitary solvent, namely, ethyl acetate, carrying a small amount of wax sufficient to bring about the desired retardation of evaporation. Thus from one to five per cent of mineral wax such as paraffin or ceresin wax may be used. Other waxes such as beeswax likewise may be employed in some cases. Preference however is given to the mineral waxes as these have specific retarding effects.

Larger amounts of wax than will go into solution readily in the ethyl acetate serve to thicken the remover to make a pasty form. In general however I prefer to use the minimum amount of wax consistent with the desired measure of retardation of evaporation and less than three per cent of good quality hard paraffin wax is the preferred proportion.

Ceresin wax forms a smoother pasty composition when such consistency is desired than is the case with paraffin wax. Ceresin wax therefore is better for paste removers and paraffin wax is well adapted for making liquid removers.

A desirable addition to the remover and one which forms a preferred feature of the invention is nitrocellulose in the form of soluble cotton pyroxylin cotton or preferably celluloid in the form of ordinary scrap celluloid. The latter represents the cheapest commercially available form of such material. Likewise moving picture film may be used. The nitrocellulose or pyroxylin acts in such solutions as a protective colloid for the wax enabling a better degree of gelatinization to be secured. This is especially the case with paraffin wax which has a more crystalline tendency than the amorphous ceresin wax.

The presence of one or two per cent of pyroxylin increases the stability of the paraffin wax in that form in solution whereby the most effective film forming qualities are obtained. This condition of gelatinization of the wax, due to the protective colloid nitrocellulose, appears to make the film more impervious. The amount of pyroxylin may be increased or decreased to make thinner or thicker solutions. Other protective colloids such for example as cellulose acetate may be used in some cases.

The preparation of remover is very simple. For example one may proceed by agitating and warming the ethyl acetate with two or three per cent by weight of paraffin wax and a like quantity of moving picture film. When solution is complete the remover is ready for use.

While anhydrous ethyl acetate is preferred other commercial forms of this ester likewise may be employed. In other words ethyl acetate containing various impurities not militating against its solvent action for this purpose may be utilized. Hence ethyl acetate containing a few per cent of ethyl alcohol or a slight degree of acidity due to the presence of acetic acid is not necessarily objectionable. In fact ethyl acetate containing even five to ten per cent or so of ethyl alcohol may be used in some cases. I prefer, however, not to have present more than small or minute amounts of hydrocarbons such as benzol.

A more specific form of the invention is one which relates to the use of relatively minute quantities of wax in ethyl acetate; no nitrocellulose or other bodying agent being present. Thus one per cent of hard paraffin wax may be incorporated with ethyl acetate by shaking together at room temperature or by melting the wax and adding gradually to the ethyl acetate with agitation or by dissolving wax in the ester while warming. This solution containing about one per cent of wax is capable of forming a film on exposure at average room temperature. Even less than this amount of wax, three-fourths of a per cent for example, may be used in some cases. While I have stated that nitrocellulose need not be used it likewise may be added for example in an amount of one or two per cent to the solution to serve as a protective colloid and bodying agent. A specific form of the present invention therefore involves ethyl acetate, pure or commercial, anhydrous or containing small amounts of water, with approximately one per cent of wax or less and with or without a protective colloid.

What I claim is:

1. A finish remover consisting of ethyl acetate as the sole solvent material incorporated with a few per cent of mineral wax.

2. A finish remover comprising anhydrous ethyl acetate as the sole solvent material incorporated with a few per cent of mineral wax.

3. A non-aqueous finish remover comprising ethyl acetate as the sole solvent material, a few per cent of wax and nitrocellulose.

4. A non-aqueous finish remover comprising ethyl acetate as the sole solvent material incorporated with a few per cent each of paraffin wax and moving picture film.

5. A finish remover consisting of ethyl acetate carrying about one per cent of paraffin wax in a form capable of forming on exposure a film which is capable of substantially retarding the evaporation of the ethyl acetate.

6. A method of removing surface finish which comprises the step of applying thereto, a finish remover containing a wax, and as the solvent therefor, ethyl acetate without other wax solvents.

7. A method of removing surface finish which comprises the step of applying thereto, a finish remover containing a waxy material dissolved in a wax solvent consisting essentially of ethyl acetate, such remover being substantially free from hydrocarbon wax solvents and substantially free from water.

8. A finish remover consisting of ethyl acetate as the sole solvent material incorporated with about 0.75 to 5% of mineral wax.

9. A finish remover comprising anhydrous ethyl acetate as the sole solvent material incorporated with about 0.75 to 5% of mineral wax.

CARLETON ELLIS.